(12) United States Patent
Parshin et al.

(10) Patent No.: US 10,462,604 B2
(45) Date of Patent: Oct. 29, 2019

(54) HIGH DENSITY LOCATION-BASED SERVICE ZONE MANAGEMENT FOR A GEOGRAPHIC REGION

(71) Applicant: Amazon Technologies, Inc., Seattle, WA (US)

(72) Inventors: Sergey Parshin, Redcliffe (AU); Ronen Barenboim, Redmond, WA (US); Michael Bowerman, Seattle, WA (US); Jon Robert Ducrou, West End (AU); Ryan Hapgood, Belmont (AU); Qiwei Liu, Santa Clara, CA (US); Michael Schollmeyer, Seattle, WA (US); James Michael Sutula, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/156,361

(22) Filed: Oct. 10, 2018

(65) Prior Publication Data
US 2019/0058968 A1 Feb. 21, 2019

Related U.S. Application Data

(63) Continuation of application No. 15/670,430, filed on Aug. 7, 2017, now Pat. No. 10,129,694.

(51) Int. Cl.
*H04W 24/00* (2009.01)
*H04W 4/021* (2018.01)
(Continued)

(52) U.S. Cl.
CPC ............ *H04W 4/021* (2013.01); *H04L 67/18* (2013.01); *H04W 4/025* (2013.01); *H04W 4/18* (2013.01); *H04W 4/21* (2018.02)

(58) Field of Classification Search
CPC ....... H04W 4/021; H04W 4/025; H04W 4/18; H04W 4/028; H04W 36/14; H04L 67/18
(Continued)

(56) References Cited

U.S. PATENT DOCUMENTS 7,983,691 B1 * 7/2011 Wong .................... G01S 5/0284
455/414.2
8,838,751 B1 9/2014 Scofield et al.
(Continued)

FOREIGN PATENT DOCUMENTS

EP 3 025 527 A2 6/2016

OTHER PUBLICATIONS

U.S. Appl. No. 15/601,533, filed May 22, 2017, Final Office Action dated Feb. 4, 2019.
(Continued)

*Primary Examiner* — Marceau Milord
(74) *Attorney, Agent, or Firm* — Thomas Horstemeyer, LLP

(57) ABSTRACT

Disclosed are various embodiments for managing which location-based service zones to monitor when the number location-based service zones within a geographic region exceed the amount the device can support. An active zone defining a geographic region and location-based service zones within the geographic region is provided by another computing device. When the number of location-based service zones meets or exceeds a predefined threshold, a subset of the location-based service zones is selected for monitoring according to a current device location and/or other parameters.

20 Claims, 5 Drawing Sheets

(51) Int. Cl.
*H04W 4/18* (2009.01)
*H04W 4/02* (2018.01)
*H04L 29/08* (2006.01)
*H04W 4/21* (2018.01)

(58) Field of Classification Search
USPC ..... 455/456.3, 456.1, 404.2, 457, 67.11, 446
See application file for complete search history.

(56) References Cited

U.S. PATENT DOCUMENTS

| | | |
|---|---|---|
| 9,258,677 B2 | 2/2016 | Saha |
| 9,503,860 B1 | 11/2016 | Mankovskii |
| 9,648,581 B1 | 5/2017 | Vaynblat et al. |
| 9,651,673 B2 | 5/2017 | Lacatus |
| 9,749,206 B2 | 8/2017 | Jung |
| 9,749,794 B2 * | 8/2017 | Saha ................ H04W 4/021 |
| 9,948,492 B2 | 4/2018 | Jung |
| 9,973,892 B1 | 5/2018 | Parshin et al. |
| 10,057,412 B1 * | 8/2018 | Salour ............... H04L 65/104 |
| 10,104,605 B1 * | 10/2018 | Parshin ............. H04W 48/18 |
| 10,122,682 B1 * | 11/2018 | Salour .................. H04M 7/006 |
| 10,123,163 B2 * | 11/2018 | Kernan ............... H04W 4/029 |
| 10,129,694 B1 * | 11/2018 | Parshin .............. H04W 4/21 |
| 2008/0174485 A1 | 7/2008 | Carani |
| 2009/0006211 A1 | 1/2009 | Perry |
| 2009/0268652 A1 | 10/2009 | Kneckt et al. |
| 2011/0153428 A1 | 6/2011 | Ramer |
| 2012/0001938 A1 | 1/2012 | Sandberg |
| 2012/0309413 A1 | 12/2012 | Grosman et al. |
| 2013/0267253 A1 | 10/2013 | Case et al. |
| 2013/0304576 A1 | 11/2013 | Berland |
| 2013/0310053 A1 | 11/2013 | Srivastava |
| 2014/0045521 A1 | 2/2014 | Grainger |
| 2014/0058815 A1 | 2/2014 | Hirernath |
| 2014/0162692 A1 | 6/2014 | Li et al. |
| 2014/0164118 A1 | 6/2014 | Polachi |
| 2014/0370909 A1 | 12/2014 | Natucci |
| 2015/0024773 A1 | 1/2015 | Li |
| 2015/0094097 A1 | 4/2015 | Fraccaroli |
| 2015/0149286 A1 | 5/2015 | Brown, II |
| 2015/0223022 A1 | 8/2015 | Kumar |
| 2015/0326624 A1 | 11/2015 | Rajendran et al. |
| 2015/0341747 A1 | 11/2015 | Barrand et al. |
| 2016/0094944 A1 | 3/2016 | Kong et al. |
| 2016/0135005 A1 | 5/2016 | Saha |
| 2017/0048666 A1 | 2/2017 | Choi |
| 2017/0078840 A1 | 3/2017 | Saurav et al. |
| 2017/0300968 A1 | 10/2017 | Reiver |
| 2017/0372055 A1 | 12/2017 | Robinson |
| 2018/0020324 A1 * | 1/2018 | Beauford ............. H04W 4/021 |

OTHER PUBLICATIONS

International Search Report and Written Opinion in International application No. PCT/US2018/030651 dated Jul. 4, 2018, 17 pages.
International Search Report and Written Opinion in International application No. PCT/US2018/030646 dated Jul. 24, 2018, 14 pages.
U.S. Appl. No. 15/601,508, filed May 22, 2017, Notice of Allowance dated May 29, 2018.
U.S. Appl. No. 15/601,533, filed May 22, 2017, Non-Final Office Action dated Jul. 17, 2018.
U.S. Appl. No. 15/601,508, filed May 22, 2017, Non-Final Office Action dated Jan. 25, 2018.
U.S. Appl. No. 15/601,508, filed May 22, 2017, Response to Non-Final Office Action dated Jan. 25, 2018.
U.S. Appl. No. 15/601,538, filed May 22, 2017, Notice of Allowance dated Mar. 27, 2018.
U.S. Appl. No. 15/670,430, filed Aug. 7, 2017, Notice of Allowance dated Jul. 5, 2018.
U.S. Appl. No. 15/670,430, filed Aug. 7, 2017, Non-Final Office Action dated Feb. 23, 2018.
International Search Report and Written Opinion in International application No. PCT/US2018/043222 dated Oct. 22, 2018, 14 pages.
U.S. Appl. No. 15/670,441, filed Aug. 7, 2017, Final Office Action dated Mar. 13, 2019.
U.S. Appl. No. 15/670,441 filed on Aug. 7, 2017, Notice of Allowance dated Aug. 2, 2019.

* cited by examiner

HIGH DENSITY LOCATION-BASED SERVICE ZONE MANAGEMENT FOR A GEOGRAPHIC REGION

CROSS-REFERENCE TO RELATED APPLICATION

This application is a continuation of co-pending U.S. utility application entitled, "High Density Location-Based Service Zone Management for a Geographic Region," having Ser. No. 15/670,430, filed Aug. 7, 2017, which is entirely incorporated herein by reference.

BACKGROUND

Geographic fences, or "geofences," and beacons can be used for marketing purposes with respect to location-based services. For example, geofences can be used to provide notifications to a mobile device when the mobile device enters a geographic region defined by the boundaries of a geofence. Likewise, when a mobile device is physically close to a beacon broadcasting a wireless signal, the mobile device can receive the broadcasted signal and a notification may be triggered. The notifications associated with geofences and/or beacons may relate to the location-based services.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
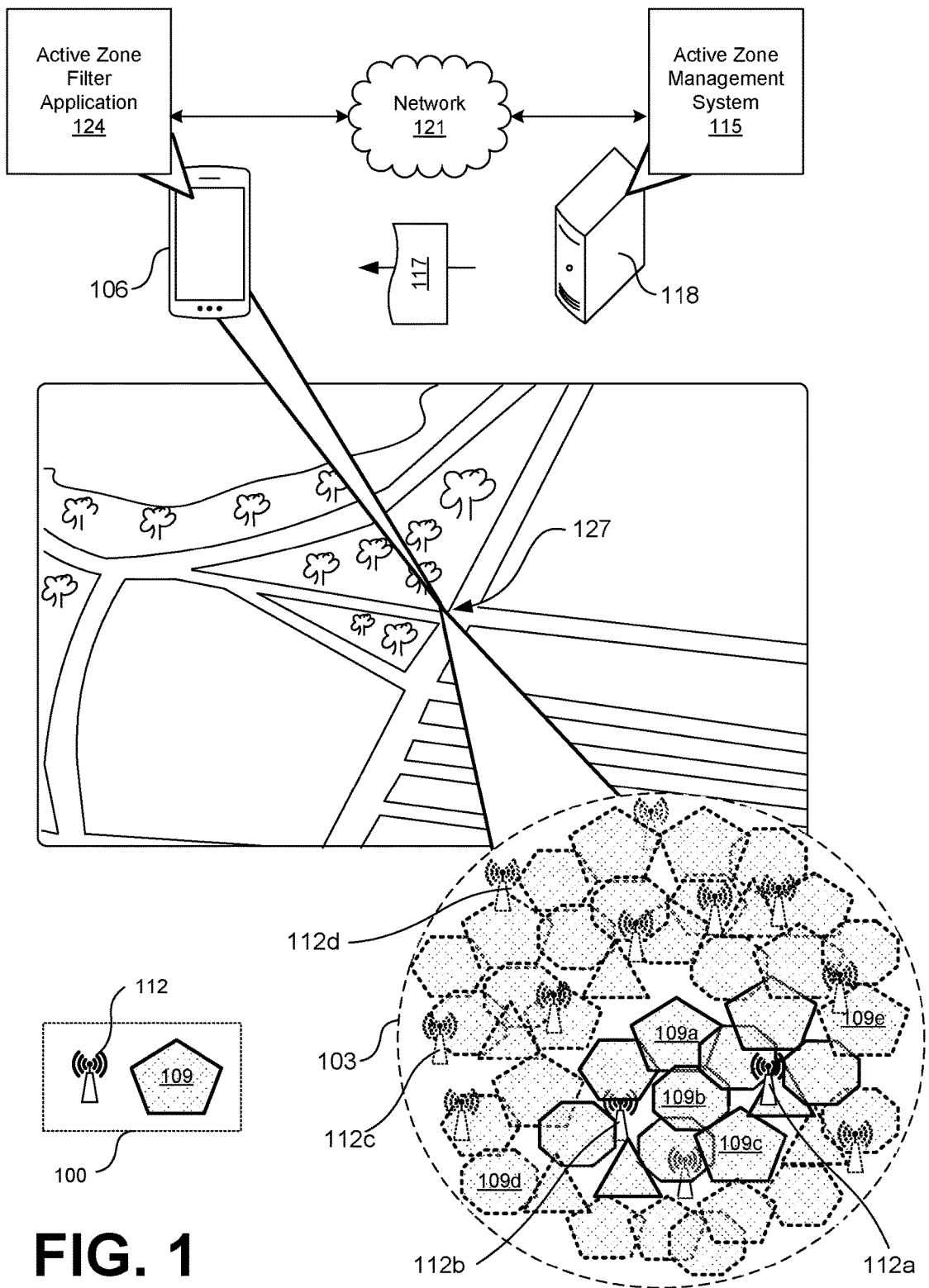
FIG. 1 is a drawing depicting an example scenario in which a client device selects a subset of location-based service zones to monitor within a provided active zone according to various embodiments of the present disclosure.

The present disclosure relates to various systems and methods for managing location-based service zones (e.g., geofences, beacons, etc.) being monitored by a client device. Some embodiments of the present disclosure relate to receiving a comprehensive set of location-based service zones within a dynamically sized region surrounding a user device and dynamically filtering the location-based service zones to determine a subset of the location-based service zones within the dynamically sized region to monitor. The filtering may be based on a variety of factors such as, for example, device limitations, current location, previously monitored location-based service zones, device speed, device direction, user interaction history, aggregate user interaction history, etc.

Examples of location-based service zones include geographic fences ("geofences") and beacons. A geofence can be defined as a virtual geographic boundary, such as the combination of a geographic coordinate and a radius. For example, a geofence may define an area in which a user may experience a location-based service associated with a particular provider. The geofenced area can be formed or defined by a virtual perimeter surrounding the area corresponding to the particular location-based service that a user may want to experience. An interior area of a geofence may be any suitable size and any suitable shape. The virtual perimeter can correspond to a two-dimensional or a three-dimensional perimeter. For example, if the provider relates to a delivery service, a two-dimensional perimeter can include an area centered on the delivery location, while a three-dimensional perimeter may include a height or altitude of the delivery location. As another example, a three-dimensional perimeter may use height or altitude in order to situate the geofence on a particular floor or suite of a building.

A beacon may include a device configured to broadcast a wireless signal. Using the example of the delivery service, a provider device may include a beacon that broadcasts a wireless signal related to the location of the provider device. When a user device is within a proximity of a beacon, the user device can receive the wireless signal, thereby triggering an event notification associated with the beacon (e.g., displaying a message, notifying the provider device of proximate location, etc.).

Providers of services (e.g., mobile store, mobile delivery service, brick-and-mortar store, etc.) may create location-based service zones to initiate user experiences relative to the services. In one non-limiting example, a provider may be associated with a merchant selling items at mobile delivery locations. Each delivery location may be associated with a respective location-based service zone. For example, when the merchant is selling the items at location A, a geofence may be created that defines a boundary surrounding the merchant location. When a user device that is monitoring the geofence crosses the boundary defined by the geofence, the client device may recognize the geofence and perform actions associated with the geofence (e.g., display message including merchant location, send notification to provider to prepare items for pickup, etc.).

One embodiment of the present disclosure relates to selecting a subset of location-based service zones to monitor within an active zone when the number of location-based service zones exceeds limitations of a client device that limit the number of location-based service zones the client device can monitor. An active zone is a dynamically sized geographic area that contains a comprehensive set of location-based service zones and is created by a server computing device. A client device can receive the active zone containing the location-based service zones from an active zone management system and monitor the location-service zones included in the active zone. When the number of location-based service zones within a particular active zone exceeds the limitations of the client device, the client device can select a subset of the location-based service zones within the active zone to monitor. Accordingly, the subset of the location-based service zones is a selection of a portion of the location-based service zones that were included in the active zone provided by the server computing device.

For example, different types of client devices may have limitations as to the number of location-based service zones the client device can support. The client device limitations may be imposed by the client device in order to optimize power usage, memory usage, and/or processor usage of the client device. In some embodiments, the client device may apply a set of filtering rules, analyze the different location-based service zones within the active zone, and select a subset of the location-based service zones based on factors such as, for example, a current location of the client device, recently broken location-based service zones being monitored by the client device (e.g., exiting or entering a location-based service zone), device speed, device direction, user interaction history, aggregate user interaction history, and/or any other factor as can be appreciated.

FIG. 1 is a drawing depicting an example scenario showing a subset of location-based service zones 100 within an active zone 103 that are being monitored by a client device 106 according to various embodiments of the present disclosure. In this example, the client device 106 corresponds to a handheld mobile device (e.g., a tablet, a smartphone, etc.). The location-based service zones 100 can comprise geofences 109 (e.g., 109a, 109b, 109c, 109d, 109e), beacons 112 (e.g., 112a, 112b, 112c, 112d), and/or any other types of location-based service zones 100 as can be appreciated.

The active zone 103 is created by the active zone management system 115 being executed on at least one computing device 118 according to at least a location of the client device 106. An active zone 103 is created to encompass the client device location according to a predefined radius. For example, in some embodiments, the active zone 103 may be created having a center at the location of the client device 106 and a radius of some predetermined value (e.g., 1 kilometer (km), 5 km, 25 km, etc.). Once the active zone 103 is created, location-based service zones 100 within the active zone 103 may be identified. In some embodiments, the radius has a minimum predefined value (e.g., 1 km, 3 km). This minimum predefined value may be based on device limitations, design choice, precision capabilities for identifying location-based service zones, and/or any other factor as can be appreciated.

The active zone management system 115 may create an active zone 103 and transmit active zone data 117 (e.g., geographic parameters, location-based service zone parameters, etc.) to the active zone filter application 124 being executed on the client device 106. The active zone 103 can be created with respect to a client device location 127. The client device location 127 can be determined and/or estimated according to coordinates provided by the client device 106, location-based service zone entry and/or exit history, and/or any other way of determining and/or estimating a device location 127.

In some embodiments, the client device 106 may request an active zone 103 from the computing device 118. In other embodiments, the active zone management system 115 may send an active zone 103 to the client device 106 without a request from the client device 106. For example, the active zone management system 115 may generate and send an active zone 103 to the client device 106 periodically. In another example, the active zone management system 115 may send an active zone 103 to the client device upon detection of an exit from a previously monitored active zone 103. The exit from a previously monitored active zone 103 can be determined according to a device location 127 being received from the client device 106, a trigger notification received from the client device 106 indicating that the client device 106 has exited the geographic region defining the active zone 103, and/or any other factor as can be appreciated.

Upon creation of the active zone 103, the active zone management system 115 transmits active zone data 117 to the client device 106. The active zone data 117 includes the data associated with an active zone 103 created for the client device 106 and by the active zone management system 115. The active zone data 117 may include geofence parameters 230 (FIG. 2), beacon parameters 233 (FIG. 2), aggregate interaction data 215 (FIG. 2), and/or any other type of data that can be appreciated.

In some embodiments, the active zone data 117 includes parameters for a quantity of location-based service zones 100 that exceeds a device supported threshold. The device supported threshold may be defined according to client device limitations that may be imposed by the client device 106 in order to optimize power usage, memory usage, and/or processor usage of the client device 106. For example, a particular client device 106 may only be able to monitor fifty (50) location-based service zones 100 at a given time. As such, if the active zone 103 provided by the active zone management system 115 includes a quantity of location-based service zones 100 that exceeds the quantity supported by the client device 106, the number of location-based service zones 100 within the provided active zone 103 will need to be reduced for monitoring.

When the quantity of location-based service zones 100 exceeds a predefined threshold, the active zone filter application 124 can select a subset of location-based service zones 100 to be monitored. For example, in FIG. 1, the active zone 103 includes multiple geofences 109 and multiple beacons 112. However, only a subset of geofences 109 and beacons 112 are being monitored (e.g., 109a, 109b, 109c, 112a, 112b). These geofences 109 and beacons 112 are defined by solid lines while the geofences 109 and beacons 112 that are not being monitored (e.g., 109d, 109e, 112c, 112d) are defined by dashed lines.

The active zone filter application 124 may select the subset of location-based service zones 100 according to factors, including, for example, current location of the client device 106, location-based service zones recently entered into or exited by the client device 106, device speed, device direction, user interaction history, aggregate user interaction history, and/or any other factor as can be appreciated. Using the example of FIG. 1, the active zone filter application 124 has selected a group of location-based service zones 100 that are clustered in the same general area of the active zone 103. In this example, the subset of location-based service zones 100 may be determined according to their respective proximity to the client device 106 and/or the direction and/or speed of movement of the client device 106.

In some embodiments, the active zone filter application 124 may determine that the subset of location-based service zones 100 needs to be updated. For example, the active zone filter application 124 may determine that the client device location 127 has changed such that one or all of the location-based service zones 100 are no longer preferred with respect to the other location-based service zones 100 within the active zone 103 that are not being monitored. As such, the active zone filter application 124 may re-evaluate the location-based service zones 100 and generate a new subset of location-based service zones 100 within the active zone 103. Because the client device 106 already has data associated with location-based service zones 100 included in the active zone 103, the client device 106 will not have to connect with the at least computing device 118 while still within the geographic region of the active zone 103. In some embodiments, the active zone filter application 124 may determine that that the subset of location-based service zones 100 need to be updated in response to detecting that the client device 106 has exited a particular location-based service zone 100, thereby changing the device location 127 of the client device 106.

In some embodiments, the active zone filter application 124 may detect that the client device 106 has exited the active zone 103 and may request an updated active zone 103 from the active zone management system 115. For example, the active zone filter application 124 may detect that the client device 106 has exited the active zone 103 in response to detecting that the client device 106 has exited a particular location-based service zone 100 that may border the geographic boundaries of the active zone 103.

In the following discussion, a general description of the system and its components is provided, followed by a discussion of the operation of the same.

Figure 2:
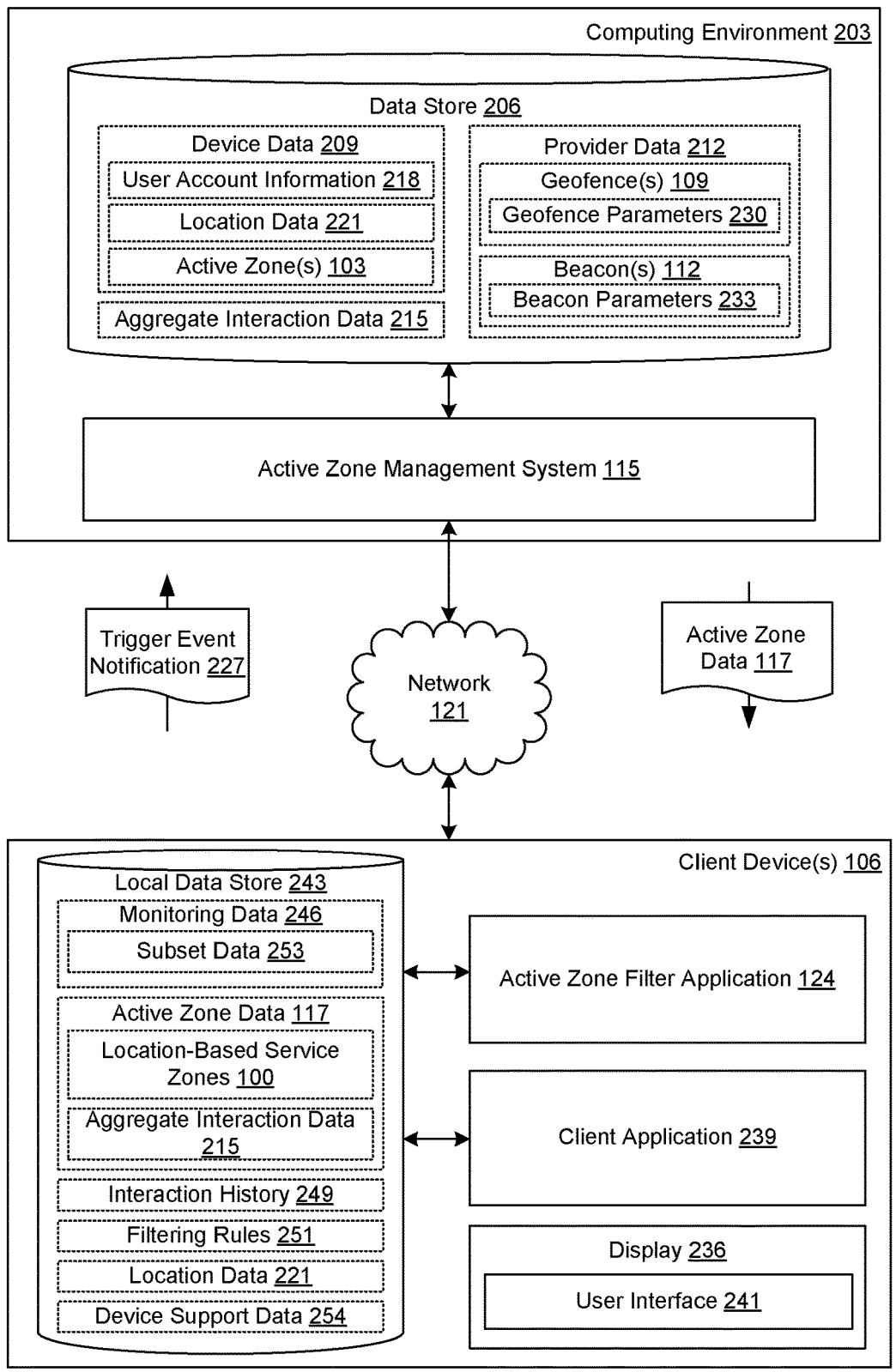
FIG. 2 is a schematic block diagram of a networked environment according to various embodiments of the present disclosure.

With reference to FIG. 2, shown is a networked environment 200 according to various embodiments. The networked environment 200 includes a computing environment 203 and a client device 106 which are in data communication with each other via a network 121. The network 121 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 206 that is accessible to the computing environment 203. The data store 206 may be representative of a plurality of data stores 206 as can be appreciated. The data stored in the data store 206, for example, is associated with the operation of the various applications and/or functional entities described below.

The components executed on the computing environment 203, for example, include an active zone management system 115, and other applications, services, processes, systems, engines, or functionality not discussed in detail herein. The active zone management system 115 is executed to create active zones 103 for a particular computing device. An active zone 103 is a dynamically sized geographic area that contains a comprehensive set of location-based service zones 100 that are selected with respect to a particular client device 106 and/or user account. In some embodiments, the active zone management system 115 can create and dynamically size an active zone 103 to include location-based service zones 100 that are specific to a particular client device 106 and client device limitations. The active zone management system 115 can identify location-based service zones 100 within the created active zone 103. The active zone management system 115 can be configured to update and modify the active zones 100 based at least in part on a change in client device location, time restrictions associated with the location-based service zones 100, additions of location-based service zones 100, removal of location-based service zones 100, change in location-based service zone parameters, and/or any other factor as can be appreciated.

The data stored in the data store 206 includes, for example, device data 209, provider data 212, aggregate interaction data 215, and potentially other data. The device data 209 includes data associated with different client devices 106. The device data 209 may include user account information 218, location data 221, active zone(s) 103, and/or any other data associated with a client device 106.

The user account information 218 may comprise information related to one or more user accounts associated with the client device 106. For example, the user account information 218 may include a username, a first and last name, and/or other identify information. The location data 221 represents a geographic location of the client device 106. The location data 221 may be determined according to geographic coordinates provided to the computing environment 203 from the client device 106. In other embodiments, the location data 221 may be determined according to recently triggered and/or broken location-based service zones 100 by the client device 106. For example, when a client device 106 enters and/or exits a particular location-based service zone 100, the client device 106 may be configured to send a trigger event notification 227 to the computing environment 203. As such, the location data 221 can be determined according to the geographic parameters of the triggered location-based service zone 100.

The active zone(s) 103 may include parameters for the active zones 103 for the particular client device 106 that contain the comprehensive set of location-based service zones 100 specifically selected for the particular device 106 in view of the device limitations, whether a service associated with a location-based service zone 100 is user-targeted (e.g., a single user) or broadly targeted (e.g., multiple users), an active status of a particular location-based service zones 100, an opt-in status by the client device 106 for the respective service, and/or any other factor as can be appreciated.

The provider data 212 includes data associated with the providers of the location-based service zones 100. The provider data 212 includes geofence(s) 109, beacon(s) 112, and/or any other data associated with the providers. The geofence 109 represents the virtual geographic boundaries related to the services of the provider. The geofence 109 includes geofence parameters 230 and/or any other type of data associated with the geofence 109. The geofence parameters 230 may include one or more coordinates associated with the geographic location, a radius of the interior area, perimeter specifications for non-circular areas, messages to be presented to the user of a client device 106 one a client device is within the boundary (e.g., "Sale at XYZ Store. Stop in and receive 50% off one item."), an active time, an active date, a unique token identifier, and/or other parameters associated with the geofence 109.

The beacon(s) 112 represent the devices configured to broadcast wireless signals. The beacon(s) 112 include beacon parameters 233 that include the beacon identifier that a client device 106 can use to access the wireless signal broadcasted from the beacon 112 when the client device 106 is within the range to receive the broadcasted signal.

The aggregate interaction data 215 includes data associated with the interaction history of multiple users. For example, as location-based service zones 100 are triggered, the active zone management system 115 and/or other application executed within the computing environment 203 may log user interaction associated with each of the triggers. However, while a user may trigger a particular location-based service zone 100, the user may not interact with the services associated with the location-based service zone 100 (e.g., purchase product). The aggregate interaction data 215 may include data associated with multiple users and may be used to determine a probability that a user may interact with a particular location-based service zone 100. For example, if that there are two different location-based service zones 100 in a particular geographic area, the aggregate interaction data 215 may indicate that more users interact with the location-based service zone 100 associated with service A than interact with the location-based service zone 100 associated with service B. In some embodiments, the aggregate interaction data 215 may be included with the active zone data 117 provided to the client device 106. The client device 106 can use the aggregate interaction data 215 as a factor in selecting a subset of location-based service zones 100 to monitor from an active zone 103.

The client device 106 is representative of a plurality of client devices that may be coupled to the network 121. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 106 may include a display 236. The display 236 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as an active zone filter application 124, a client application 239, and/or other applications. The client application 239 may be executed in a client device 106, for example, to access network content served up by the computing environment 203 and/or other servers, thereby rendering a user interface 241 on the display 236. To this end, the client application 239 may comprise, for example, a browser, a dedicated application, etc., and the user interface 241 may comprise a network page, an application screen, etc. The client device 106 may be configured to execute applications beyond the client application 239 such as, for example, email applications, social networking applications, word processors, spreadsheets, and/or other applications.

The active zone filter application 124 is executed to select a subset of location-based service zones 100 included in an active zone 103 received from the active zone management system 115 according to various embodiments of the present disclosure. Some geographic regions may contain a dense amount of location-based service zones 100. When the active zone filter application 124 receives an active zone 103 containing more location-based service zones 100 than are supported by the client device 106, the active zone filter application 124 may select a subset of location-based service zones 100 included in the received active zone 103 according to a variety of factors such as, for example, current location of the client device 106, recently broken location-based service zones 100 by the client device 106, device speed, device direction, user history, aggregate user history, and/or any other factor as can be appreciated. In some embodiments, the active zone filter application 124 may assign a score to each of the location-based service zones 100 included in the received active zone 103 based at least in part on the above factors and filtering rules 251. The location-based service zones 100 can be ranked and the highest ranked location-based service zones 100 within the device-supported threshold can be included in the subset of location-based service zones 100 to be monitored. The active zone filter application 100 may also determine when to update the subset of location-based service zones 100 and/or request a new active zone 103 from the active zone management system 115.

The client device 106 may store various data in a local data store 243. The data stored in the location data store 243 may comprise for example, monitoring data 246, active zone data 117, interaction history 249, filtering rules 251, location data 221, client support data 254, and/or other data. The monitoring data 246 includes data associated with the subset of location-based service zones 100 within an active zone 103 that are being monitored at a particular instance. The monitoring data 246 includes the subset data 253, which can include one or more coordinates associated with the geographic location, a radius of the interior area, perimeter specifications for non-circular areas, messages to be presented to the user of a client device 106 when a client device 106 is within the boundary (e.g., "Sale at XYZ Store. Stop in and receive 50% off one item."), an active time, an active date, a unique token identifier, a beacon identifier that a client device 106 can use to access the wireless signal broadcasted from the beacon 112 when the client device 106 is within the range to receive the broadcasted signal, and/or any other parameter data associated with the selected subset of location-based service zones 100 within an active zone 103.

The active zone data 117 includes the data associated with an active zone 103 created for the client device 106 and by the active zone management system 115. The active zone data 117 may include geographic parameters defining the geographic region of the active zone 103, location-based service zones 100, aggregate interaction data 215, and/or any other type of data that can be appreciated. The location-based service zones 100 may comprise the geofence parameters 230 and/or beacon parameters 233 for the location-based service zones 100 that were included in the active zone 103 created by the active zone management system 115.

The interaction history 249 includes data associated with prior triggers and interactions with location-based service zones 100. For example, the interaction history 249 may include data related to whether or not a user had an interaction with a service upon entering and/or exiting a particular location-based service zone 100; for example, when a location-based service zone 100 was associated with a particular store. If the user associated with the client device 106 purchased an item at the store, the interaction history 249 would indicate the purchase of the item with respect to the location-based service zone 100.

Likewise, if the user did not purchase an item at the store, the interaction history 249 may indicate the lack of the purchase at the store. The interaction history 249 may be used by the active zone filter application 124 in determining the subset of location-based service zones 100 within the received active zone 103 to monitor. In some embodiments, the interaction history 249 may include information pertaining to previously broken location-based service zones (e.g., exiting or entering a geofence parameter, no longer within distance to receive broadcasted beacon signal, etc.). This information can be used to estimate the direction, speed, and/or location of the client device at a given time.

The filtering rules 251 comprise rules associated with selecting the subset of location-based service zones 100. In some embodiments, the filtering rules 251 may comprise algorithms such as a ranking algorithm, for example, for determining a priority of the location-based service zones 100 within the active zone 103. For example, the filtering rules 251 may comprise weights to assign for various features associated with each location-based service zone 100. Based on the assigned weights, the location-based service zones 100 that are identified within a created active zone 103 may be ranked and the highest ranked location-based service zones 100 that are within the maximum threshold supported by the client device 106 may be selected for the subsets.

In one embodiment, the filtering rules 251 may include weights to assign according to a level of probability of interaction. For example, if a first location-based service zone 100 has a higher probability of resulting in a user interaction over a second location-based service zone 100 according to the interaction history 249 and/or the aggregate interaction data 215, the first location-based service zone 100 may be assigned a weight that is higher than a weight assigned to the second location-based service zone 100. The filtering rules 251 may further comprise rules that can be applied to determine a distance threshold for considering a particular location-based service zone 100. For example, the filtering rules 251 may indicate a particular distance threshold that a location-based service zone 100 must meet in relation to the client device location in order to be considered for inclusion in the subset.

The location data 221 corresponds to the location of the client device 106 at a particular instance. For example, the location data 221 may comprise geographic coordinates of the client device 106. In other embodiments, the location data 221 may comprise an estimated location based at least in part on recently triggered and/or broken location-based service zones 100. For example, if the client device 106 exited a particular location-based service zone 100, the location data 221 can be estimated according to the geographic parameters of the particular location-based service zone 100.

The device support data 254 includes a quantity of location-based service zones 100 supported by the client device 106, and/or other features supported by the device. The client device limitations may be imposed by the client device in order to optimize power usage, memory usage, and/or processor usage of the client device 106.

Figure 3:
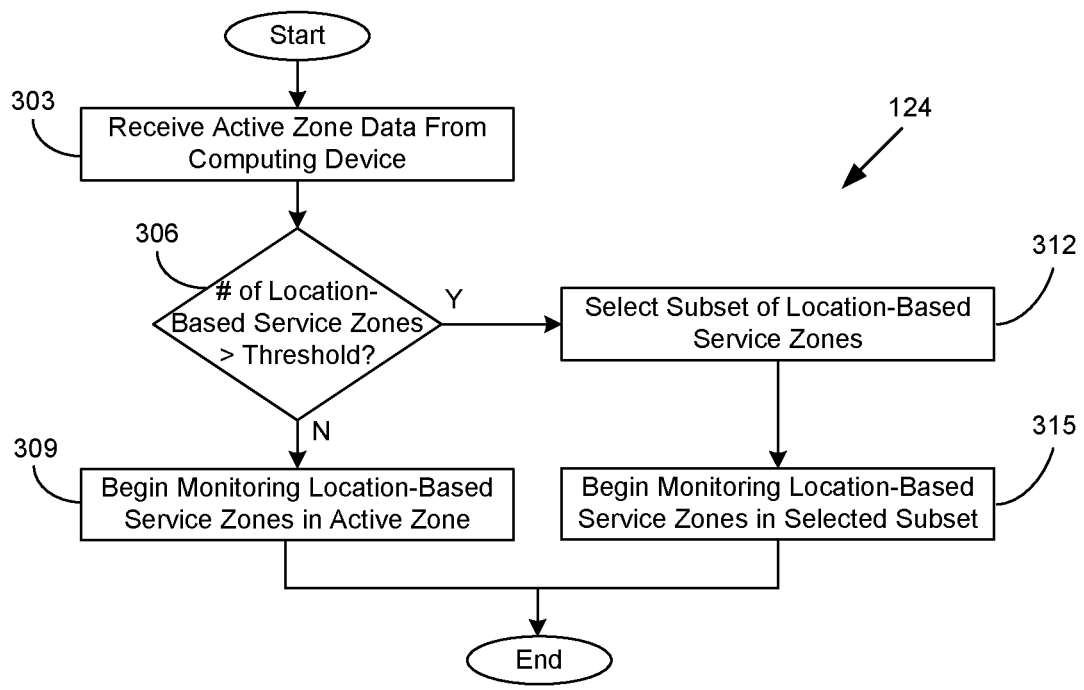
FIG. 3 is a flowchart illustrating one example of functionality implemented as portions of an active zone filter application executed in a client device in the networked environment of FIG. 2 according to various embodiments of the present disclosure.

Referring now to FIG. 3, shown is a flowchart that provides one example of the operation of a portion of the active zone filter application 124 according to various embodiments. It is understood that the flowchart of FIG. 3 provides merely an example of the many different types of functional arrangements that may be employed to implement the operation of the portion of the active zone filter application 124 as described herein. As an alternative, the flowchart of FIG. 3 may be viewed as depicting an example of elements of a method implemented in the client device 106 (FIG. 1) according to one or more embodiments.

FIG. 3 provides a non-limiting example of the functionality that may be performed by the active zone filter application 124 with respect to selecting a subset of location-based service zones 100 (FIG. 2) within an active zone 103 (FIG. 1) according to various embodiments of the present disclosure.

Beginning with box 303, the active zone filter application 124 receives active zone data 117 (FIG. 1) from the computing device 118 (FIG. 1). The active zone data 117 includes the data associated with an active zone 103 (FIG. 1) created for the client device 106 and by the active zone management system 115 (FIG. 1). The active zone data 117 may include geofence parameters 230 (FIG. 2), beacon parameters 233 (FIG. 2), aggregate interaction data 215, and/or any other type of data that can be appreciated. In some embodiments, the active zone data 117 is received in response to a request for an active zone 103 by the client device 106. In other embodiments, the active zone data 117 is received without a request for the active zone 103. For example, the computing device 118 may be configured to detect when the client device 106 has exited a previously created active zone 103. Upon detection of the client device 106 exiting the previously created active zone 103, the active zone management system 115 creates a new active zone 103 and provides the active zone data 117 to the client device 106.

In box 306, the active zone filter application 124 determines whether a number of location-based service zones 100 included in the active zone data 117 meets or exceeds a predefined threshold. In some embodiments, the predefined threshold is defined according to device limitations associated with the client device 106. For example, client device A may be able to support twenty (20) location-based service zones and client device B may be able to support one-hundred (100) location-based service zones 100. The client device limitations may be imposed by the client device 106 in order to optimize power usage, memory usage, and/or processor usage of the client device 106. If the number of location-based service zones 100 is within the predefined threshold, the active zone filter application 124 proceeds to box 309. In box 309, the active zone filter application 124 initiates the monitoring of the location-based service zones 100 within the active zone 103 by the client device 106.

If the number of location-based service zones 100 exceeds the predefined threshold, the active zone filter application 124 proceeds to box 312. In box 312, the active zone filter application 124 selects a subset of location-based service zones 100 within the active zone 103 to monitor. In some embodiments, the client device 106 may apply a set of filtering rules 251, analyze the different location-based service zones 100 within the active zone 103, and select a subset of the location-based service zones 100 based on factors such as, for example, current location of the client device 106, location-based service zones 100 recently entered into and/or exited by the client device 106, device speed, device direction, user history, aggregate user history, and/or any other factor as can be appreciated.

In some embodiments, the active zone filter application 124 may determine a client device location 127 according to a broken location-based service zone 100 that the client device 106 had been monitoring. By knowing the geographic parameters associated with the broken location-based service zone 100, the client device location 127 can be estimated. In some embodiments, the active zone filter application 124 may select the subset of location-based service zones 100 according to a predefined distance from the estimated client device location 127. For example, any location-based service zones 100 that are within fifty (50) yards (yds) from the client device location 127 may be selected for inclusion in the subset of location-based service zones 100.

In some embodiments, the active zone filter application 124 applies filtering rules 251 to select the subset of location-based service zones 100. For example, the filtering rules 251 may comprise algorithms such as a ranking algorithm, for example, to determine a priority of the location-based service zones 100 within the active zone 103. In some embodiments, the filtering rules 251 may comprise weights to assign for various features associated with each location-based service zone 100. Based on the assigned weights, the location-based service zones 100 that are identified within a created active zone 103 may be ranked, and the highest ranked location-based service zones 100 that are within the maximum threshold supported by the client device 106 may be selected for the subset. In another non-limiting example, the filtering rules 251 may indicate types of location-based service zones 100 that are not to be monitored. For example, the filtering rules 251 may indicate that any types of location-based service zones 100 that relate to coffee shops are to be removed from consideration.

In other embodiments, the active zone filter application 124 may analyze aggregate interaction data 215 and select the subset of location-based service zones 100 according to the aggregate interaction data 215. For example, the aggregate interaction data 215 can be used to determine a probability that user will have an interaction with a particular location-based service zone 100 based on the interaction data of multiple users.

In some embodiments, the active zone filter application 124 may determine the speed and/or the direction of the client device 106. This information may be used to determine a course associated with the client device 106. As such, the subset of location-based service zones 100 may be selected according to the course associated with the client device 106.

After selecting the subset of location-based service zones 100, the active zone filter application 124 proceeds to box 315. In box 315, the active zone filter application 124 initiates monitoring of the subset of location-based service zones 100 from the active zone 103. Upon initiating the monitoring of the location-based service zones 100, this portion of the active zone filter application 124 ends.

Figure 4:
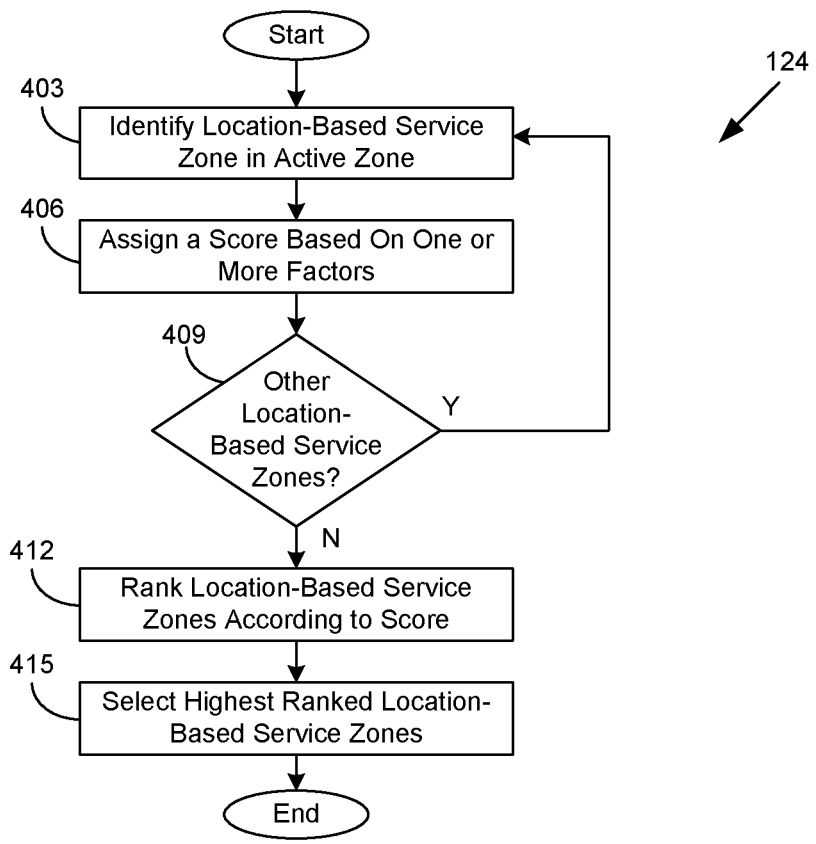
FIG. 4 is a flowchart illustrating one example of functionality implemented as portions of an active zone filter application executed in a client device in the networked environment of FIG. 2 according to various embodiments of the present disclosure.

Turning now to FIG. 4, shown is a flowchart that provides one example of the operation of a portion of the active zone filter application 124 according to various embodiments. It is understood that the flowchart of FIG. 4 provides merely an example of the many different types of functional arrangements that may be employed to implement the operation of the portion of the active zone filter application 124 as described herein. As an alternative, the flowchart of FIG. 4 may be viewed as depicting an example of elements of a method implemented in the client device 106 (FIG. 1) according to one or more embodiments.

FIG. 4 provides a non-limiting example of the functionality that may be performed by the active zone filter application 124 with respect to prioritizing location-based service zones 100 (FIG. 1) to include in the active zone 103 (FIG. 1) when the quantity of location-based service zones 100 originally identified in the active zone 103 received from the computing device 118 (FIG. 1) exceeds the maximum threshold that the client device 106 can support according to various embodiments of the present disclosure.

Beginning with box 403, the active zone filter application 124 identifies a location-based service zone 100 included within the active zone 103 received from the computing device 118. At box 406, the active zone filter application 124 analyzes the location-based service zone 100 and assigns a score to the location-based service zone 100 according to one or more factors. The one or more factors may include a type of service associated with the location-based service (e.g., retail, delivery, etc.), a distance between the location-based service zone 100 and a client device location 127, a probability that a user interaction will occur based in part on user interaction history 249 and/or aggregate interaction data 215, broken location-based service zones 100, client device direction, client device speed, and/or any other factor as can be appreciated.

In some embodiments, the score is determined according to weights defined in the filtering rules 251. For example, each factor may be given a particular weight, and the score for the location-based service zone 100 is based on a sum of weights assigned to each analyzed factor. In one non-limiting example, the location-based service zone A receives a weight of "1" for being within a predefined distance of the client device location 127 while location-based service zone B receives a weight of "0" for being outside a predefined distance of the client device location 127. Further, assume that the probability of a user interaction with location-based service zone B is greater than the probability of user interaction with location-based service zone A, and that the weight assigned to location-based service zone B for the probability of user interaction is "5" while the weight assigned to location-based service zone A for the probability of user interaction is "2." In this example, the score assigned to location-based service zone A may be "3" while the score for location-based service zone B may be "5."

In box 409, the active zone filter application 124 determines whether there are other location-based service zones 100 identified in the active zone 103 that have not been analyzed and/or given a score. If there are other location-based service zones 100, the active zone filter application 124 returns to box 403. Otherwise, the active zone filter application 124 proceeds to box 412. In box 412, the active zone filter application 124 ranks the location-based service zones 100 according to each respective score. In box 415, the highest ranked location-based service zones 100 within the supported threshold of location-based service zones 100 are selected to be included in the subset of location-based service zones 100 for monitoring by the client device 106. Upon selecting the subset of location-based service zones 100 for monitoring, this portion of the active zone filter application 124 ends.

Figure 5:
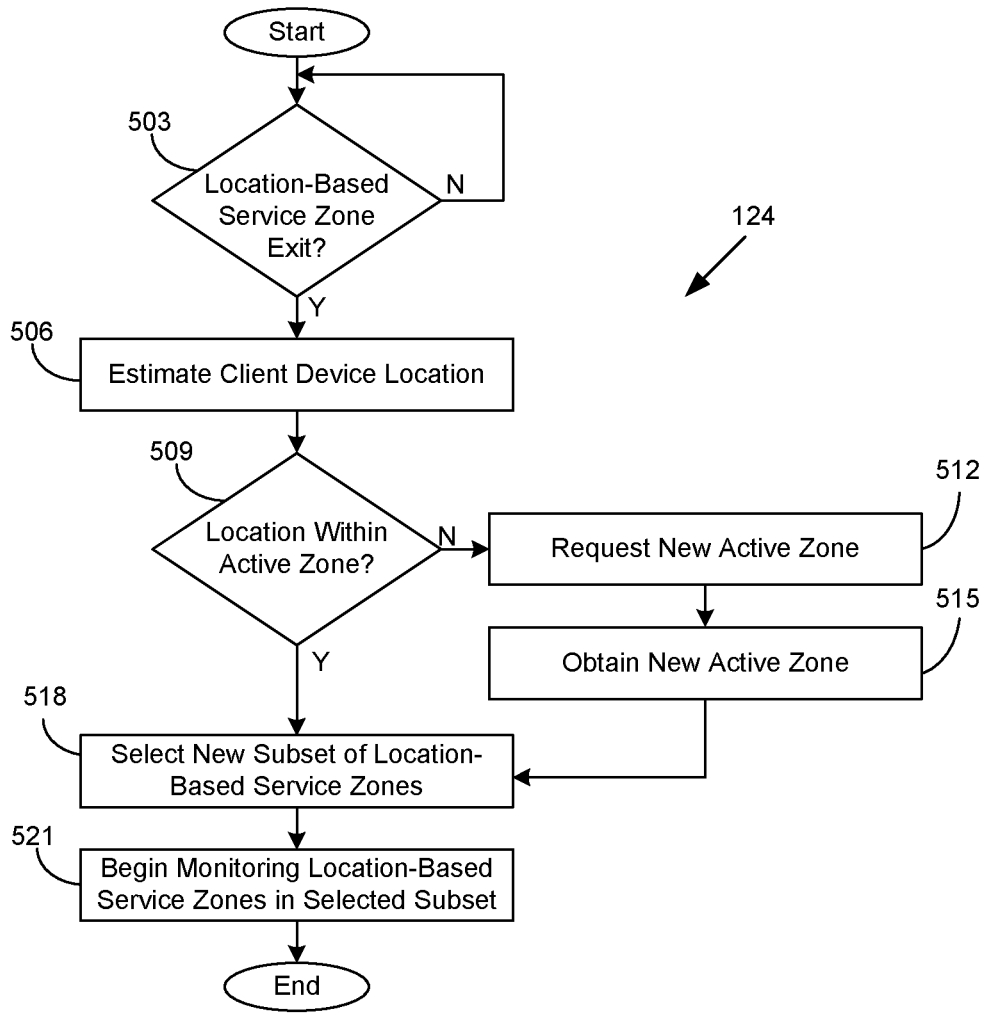
FIG. 5 is a flowchart illustrating one example of functionality implemented as portions of an active zone filter application executed in a client device in the networked environment of FIG. 2 according to various embodiments of the present disclosure.

Referring next to FIG. 5, shown is a flowchart that provides one example of the operation of a portion of the active zone filter application 124 according to various embodiments. It is understood that the flowchart of FIG. 5 provides merely an example of the many different types of functional arrangements that may be employed to implement the operation of the portion of the active zone filter application 124 as described herein. As an alternative, the flowchart of FIG. 5 may be viewed as depicting an example of elements of a method implemented in the client device 106 (FIG. 1) according to one or more embodiments.

FIG. 5 provides a non-limiting example of the functionality that may be performed by the active zone filter application 124 with respect to modifying the active zones 103 (FIG. 2) and/or location-based service zones 100 for a particular client device 106 according to various embodiments of the present disclosure.

Beginning with box 503, the active zone filter application 124 determines whether the client device 106 has exited (e.g., broken) a monitored location-based service zone 100. If the client device 106 has exited a monitored location-based service zone 100, the active zone filter application 124 proceeds to box 506. Otherwise, the active zone filter application 124 continues to monitor the location-based service zones 100 to detect an exit.

In box 506, the active zone filter application 124 estimates a client device location 127. In some embodiments, the active zone filter application 124 estimates the client device location 127 based on the geographic parameters of the broken location-based service zone 100. For example, when the location-based service zone 100 is detected as being broken in box 503, the active zone filter application 124 can determine the geographic parameters defining the broken location-based service zone 100 and use the geographic parameters as an estimate of the client device location 127. Similarly, if the client device 106 triggers a new location-based service zone 100, the active zone filter application 124 can estimate a client device location 127 based at least in part on the geographic parameters of the new location-based service zone 100. In some embodiments, the client device 106 can access geographic coordinates of its location, as can be appreciated.

In box 509, the active zone filter application 124 determines whether the client device 106 is still within the active zone 103. For example, the active zone data 117 include geographic parameters defining the geographic boundaries of the active zone 103. If the client device location 127 is outside the defined geographic boundaries of the active zone 103, the active zone filter application 124 proceeds to box 512. Otherwise, the active zone filter application 124 proceeds to box 518.

In box 512, the active zone filter application 124 requests a new active zone 103 from the active zone management system 115 in the computing environment 203. In box 515, the active zone filter application 124 receives the new active zone 103 via the active zone data 117 transmitted over the network 121. In box 518, the active zone filter application 124 selects a new subset of location-based service zones 100. The new subset of location-based service zones 100 can be based at least in part on based on factors such as, for example, current location of the client device 106, location-based service zones 100 recently entered into and/or exited by the client device 106, device speed, device direction, user history, aggregate user history, and/or any other factor as can be appreciated. In box 521, the active zone filter application 124 initiates the monitoring of the location-based service zones 100 in the newly selected subset by the client device 106. Once the client device 106 begins monitoring the new subset of location-based service zones 100, this portion of the active zone filter application 124 ends.

Figure 6:
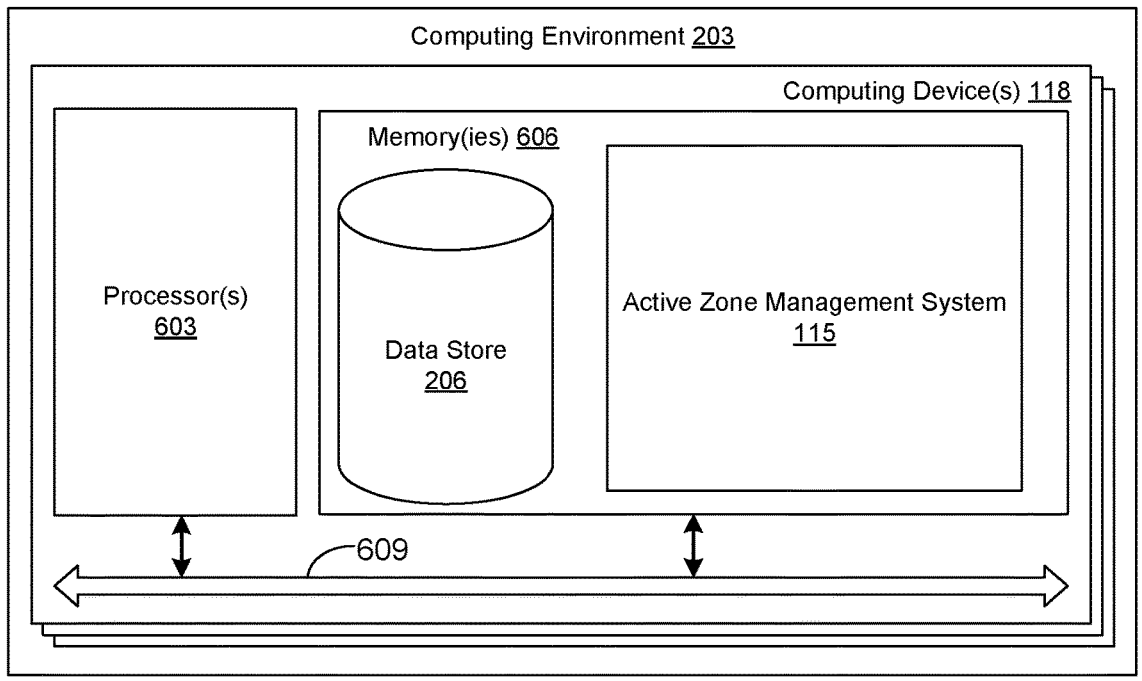
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 118. Each computing device 118 includes at least one processor circuit, for example, having a processor 603 and a memory 606, both of which are coupled to a local interface 609. To this end, each computing device 118 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the active zone management system 115, and potentially other applications. Also stored in the memory 606 may be a data store 206 and other data. In addition, an operating system may be stored in the memory 606 and executable by the processor 603.

Figure 7:
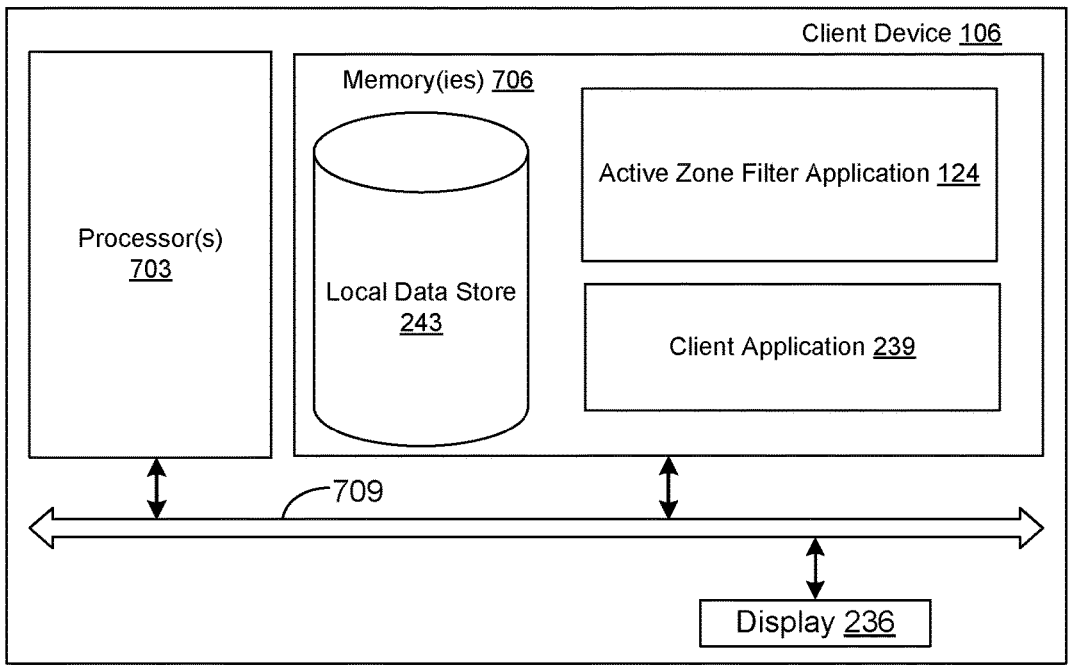
FIG. 7 is a schematic block diagram that provides one example illustration of a client device employed in the networked environment of FIG. 2 according to various embodiments of the present disclosure.

With reference to FIG. 7, shown is a schematic block diagram of the client device 106 according to an embodiment of the present disclosure. The client device 106 includes at least one processor circuit, for example, having a processor 703, a memory 706, and a display 236, all of which are coupled to a local interface 709. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the active zone filter application 124, the client application 239, and potentially other applications. Also stored in the memory 706 may be a local data store 243 and other data. In addition, an operating system may be stored in the memory 706 and executable by the processor 703.

Referring next to both FIGS. 6 and 7, it is understood that there may be other applications that are stored in the memory 606, 706 and are executable by the processor 603, 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606, 706 and are executable by the processor 603, 703. In this respect, the term "executable" means a program file that is in a form that can ultimately be run by the processor 603, 703. Examples of executable programs may be, for example, a compiled program that can be translated into machine code in a format that can be loaded into a random access portion of the memory 606, 706 and run by the processor 603, 703, source code that may be expressed in proper format such as object code that is capable of being loaded into a random access portion of the memory 606, 706 and executed by the processor 603, 703, or source code that may be interpreted by another executable program to generate instructions in a random access portion of the memory 606, 706 to be executed by the processor 603, 703, etc. An executable program may be stored in any portion or component of the memory 606, 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606, 706 is defined herein as including both volatile and nonvolatile memory and data storage components. Volatile components are those that do not retain data values upon loss of power. Nonvolatile components are those that retain data upon a loss of power. Thus, the memory 606, 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603, 703 may represent multiple processors 603, 703 and/or multiple processor cores and the memory 606, 706 may represent multiple memories 606, 706 that operate in parallel processing circuits, respectively. In such a case, the local interface 609, 709 may be an appropriate network that facilitates communication between any two of the multiple processors 603, 703, between any processor 603, 703 and any of the memories 606, 706, or between any two of the memories 606, 706, etc. The local interface 609, 709 may comprise additional systems designed to coordinate this communication, including, for example, performing load balancing. The processor 603, 703 may be of electrical or of some other available construction.

Although the active zone management system 115, the active zone filter application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the active zone filter application 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the active zone management system 115 and the active zone filter application 124 that comprises software or code can be embodied in any non-transitory computer-readable medium for use by or in connection with an instruction execution system such as, for example, a processor 603, 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the active zone management system 115 and the active zone filter application 124 may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 118, or in multiple computing devices 118 in the same computing environment 203, or in the same client device 106.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
a first computing device; and
an application executable in the first computing device, wherein, when executed, the application causes the first computing device to at least:
obtain active zone data from a second computing device, the active zone data including an identification of a plurality of location-based service zones located within a geographic region, the plurality of location-based service zones being selected for the first computing device according to a location of the first computing device, and a number of the plurality of location-based service zones exceeding a predefined threshold;
select a subset of the plurality of location-based service zones according to a respective score assigned to individual location-based service zones of the plurality of location-based service zones; and
initiate monitoring of the subset of the plurality of location-based service zones.

2. The system of claim 1, wherein the active zone data further comprises geographic parameters defining the geographic region surrounding the plurality of location-based service zones.

3. The system of claim 1, wherein the active zone data further includes aggregate interaction data corresponding to an interaction history of a plurality of users with the plurality of location-based service zones, the subset of the plurality of location-based service zones being selected based at least in part on the aggregate interaction data.

4. The system of claim 1, wherein, when executed, the application further causes the first computing device to at least:
detect an exit of the first computing device from the geographic region; and
in response to detecting the exit, send a request to the second computing device for updated active zone data, the updated active zone data including an identification of a plurality of different location-based service zones located in a different geographic region.

5. The system of claim 4, wherein, when executed, the application further causes the first computing device to at least estimate an updated location of the first computing device, the request including the updated location.

6. The system of claim 1, wherein, when executed, the application further causes the first computing device to at least generate the respective score for the individual location-based service zones based at least in part on at least one of a previously-monitored location-based service zone, a speed of the first computing device, a direction of movement of the first computing device, or a user interaction history.

7. The system of claim 1, wherein the plurality of location-based service zones comprise at least one of a geofence or a beacon.

8. A method, comprising:
selecting, via a first computing device, a subset of location-based service zones of a first plurality of location-based service zones located within an active zone that is defined by a geographic region with respect to a first location associated with the first computing device;
initiating, via the first computing device, monitoring of the subset of location-based service zones;
detecting, via the first computing device, an exit from the geographic region;
estimating, via the first computing device, a second location of the first computing device based at least in part on the exit of the first computing device from the geographic region; and
sending, via the first computing device, a request to a second computing device for an updated active zone including a second plurality of location-based service zones, the request including the second location of the first computing device and the second plurality of location-based service zones.

9. The method of claim 8, further comprising receiving, via the first computing device, updated active zone data from the second computing device, the updated active zone data corresponding to the updated active zone, and the updated active zone data including an identification of the second plurality of location-based service zones.

10. The method of claim 9, wherein a number of the second plurality of location-based service zones exceeds a client-supported threshold.

11. The method of claim 8, further comprising receiving, via the first computing device, active zone data including an identification of the first plurality of location-based service zones located within the active zone that is defined by the geographic region.

12. The method of claim 8, wherein the subset of location-based service zones are selected based at least in part on a previously-monitored location-based service zone, a speed of the first computing device, a direction of movement of the first computing device, a user interaction history, or an aggregate user interaction history.

13. The method of claim 8, further comprising:
detecting, via the first computing device, an exit from a specific location-based service zone in the subset of location-based service zones;
determining, via the first computing device, that the first computing device is located within the geographic region; and
initiating, via the first computing device, monitoring of another subset of location-based service zones of the first plurality of location-based service zones.

14. The method of claim 8, wherein the first plurality of location-based service zones and the second plurality of location-based service zones comprise at least one of a geofence or a beacon.

15. The method of claim 8, further comprising:
detecting, via the first computing device, an interaction with a particular location-based service zone within the subset of location-based service zones being monitored; and
modifying, via the first computing device, a user interaction history in response to detecting the interaction with the particular location-based service zone.

16. A system, comprising:
a client device; and
an application executable in the client device, wherein, when executed, the application causes the client device to at least:

receive active zone data including an identification of a plurality of location-based service zones included within an active zone that is defined by a geographic region, a number of location-based service zones exceeding a client-supported threshold;

initiate monitoring of a first subset of location-based service zones of the location-based service zones based at least in part on a first location of the client device;

detect an exit of the client device from a monitored location-based service zone;

estimate a second location of the client device based at least in part on the exit of the client device from the monitored location-based service zone; and initiate monitoring of a second subset of location-based service zones of the plurality of location-based service zones based at least in part on the second location of the client device.

17. The system of claim 16, wherein the second location of the client device is estimated based at least in part on a previously exited location-based service zone, a previously entered location-based service zone, a direction of movement of the client device, or a speed of movement of the client device.

18. The system of claim 16, wherein selecting the first subset of location-based service zones is based at least in part on at least one of a type of location-based service zone, geographic parameters of a respective location-based service zone, an interaction history, a course of the client device, or the client-supported threshold.

19. The system of claim 16, wherein, when executed, the application further causes the client device to at least generate a respective score for individual location-based service zones of the plurality of location-based service zones, the first subset of location-based service zones being selected according to the respective score.

20. The system of claim 16, wherein, when executed, the application further causes the client device to at least:

detect an exit of the client device from the geographic region; and send a request for an updated active zone.

* * * * *